(12) United States Patent
Badiger et al.

(10) Patent No.: US 11,379,291 B2
(45) Date of Patent: Jul. 5, 2022

(54) APPLICATION LOGGING MECHANISM

(71) Applicant: Hewlett Packard Enterprise Development LP, Houston, TX (US)

(72) Inventors: Aravind Badiger, Bangalore Karnataka (IN); Abhilash Kulkarni, Bangalore Karnataka (IN); Ravindhar Uppada, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 16/842,532

(22) Filed: Apr. 7, 2020

(65) Prior Publication Data
US 2021/0311817 A1 Oct. 7, 2021

(51) Int. Cl.
*G06F 11/07* (2006.01)

(52) U.S. Cl.
CPC ...... *G06F 11/0781* (2013.01); *G06F 11/0715* (2013.01)

(58) Field of Classification Search
CPC ............ G06F 11/0715; G06F 11/0766; G06F 11/0778; G06F 11/0781; G06F 11/3082; G06F 11/3447; G06F 11/3452; G06F 11/3466; G06F 11/3476; G06F 11/3636; H04L 41/0604; H04L 41/0609
See application file for complete search history.

(56) References Cited

U.S. PATENT DOCUMENTS

| | | | |
|---|---|---|---|
| 7,424,666 B2 | 9/2008 | Chandwani et al. | |
| 7,506,314 B2 * | 3/2009 | Kollmann | G06F 11/3476 714/45 |
| 7,730,364 B2 | 6/2010 | Chang et al. | |
| 9,183,518 B2 | 11/2015 | Yingling et al. | |
| 2002/0198983 A1 * | 12/2002 | Ullmann | G06F 11/0709 709/224 |
| 2006/0174165 A1 * | 8/2006 | Shaffer | G06F 11/3636 714/38.13 |
| 2008/0114571 A1 * | 5/2008 | Campbell | G05B 19/4183 702/189 |

(Continued)

OTHER PUBLICATIONS

Adwait Bhave, "Machine Learning to Detect Anomalies from Application Logs", available online at <https://www.druva.com/blog/machine-learning-detect-anomalies-application-logs/>, Feb. 13, 2017, 9 pages.

(Continued)

*Primary Examiner* — Gabriel Chu
(74) *Attorney, Agent, or Firm* — Jaffery Watson Mendonsa & Hamilton

(57) ABSTRACT

A system to facilitate application logging is described. The system includes a processor and a machine readable medium storing instructions that, when executed, cause the processor to record a system state, perform application logging at a first logging rate, record an occurrence of task failures during the logging, determine a predicted queue size threshold value based on the recorded occurrence of task failures, determine whether that the predicted queue size threshold value is less than an actual queue size and perform the application logging at a second logging rate upon a determination that the predicted queue size threshold value is less than an actual queue size, wherein the second logging rate is greater than the first logging rate.

20 Claims, 6 Drawing Sheets

(56) References Cited

U.S. PATENT DOCUMENTS

| | | | |
|---|---|---|---|
| 2009/0222492 A1* | 9/2009 | Yamauchi | G06F 11/3476 |
| 2013/0311625 A1* | 11/2013 | Cook | G06F 11/3476 |
| | | | 709/221 |
| 2014/0279918 A1* | 9/2014 | Han | G06F 11/366 |
| | | | 707/648 |
| 2018/0150346 A1* | 5/2018 | Jade | G06F 11/3476 |
| 2018/0241649 A1* | 8/2018 | Mazzitelli | H04L 43/024 |

OTHER PUBLICATIONS

Salfner et al., "Error Log Processing for Accurate Failure Prediction", Dec. 7, 2008, pp. 1-8.

* cited by examiner

APPLICATION LOGGING MECHANISM

BACKGROUND

An application log is a file of events that are logged by a software application, which includes errors, informational events and warnings. Specifically, a log file can reveal message flow issues and application problems, as well include information about user and system actions that have occurred.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Application log events may typically include, among other things, events that indicate significant problems (e.g., error events) that affect application operation (e.g., prevent the application from starting). However, logged events typically do not include sufficient information to diagnose various events that indicate errors. Thus, logging levels are typically increased to enable improved error diagnosis in order to reproduce issues that cause errors. However, some issues may be intermittent, resulting in a time consuming process to reproduce such issues. Moreover, setting log levels to a high level at all times may cause application problems, take too much storage space and generate a high quantity of irrelevant data that needs to be examined in order to isolate a problem.

In embodiments, a mechanism is provided to facilitate application log management by generating a sufficient amount of log data to eliminate the need to reproduce an issue, while reducing the quantity of irrelevant log data. In such embodiments, an application logging mechanism dynamically activates logging at a highest level just prior to a fault and deactivates the logging at the highest level (e.g., resumes operating at a normal logging level) after a predetermined time interval, or after the fault has been addressed. In further embodiments, the dynamic activation and deactivation is performed by recording various system states and using predictive modeling to predict a probability of an issue occurring and to change log levels accordingly.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
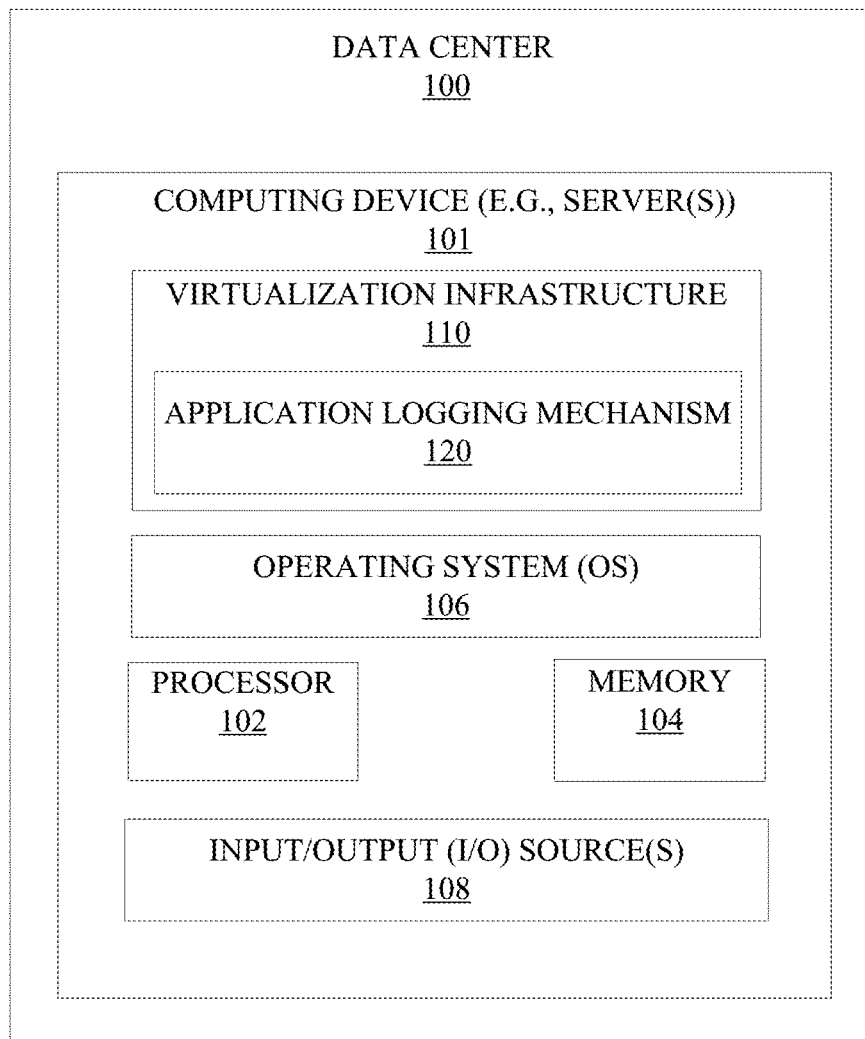
FIG. 1 illustrates one embodiment of a system employing a data center.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization for a plurality of host resources (or virtualization hosts) included within data center 100. In one embodiment, virtualization infrastructure 110 is a software-defined infrastructure that enables compute, networking and storage resources to be flexibly configured on a per-application basis from commoditized hardware. As shown in FIG. 1, virtualization infrastructure 110 includes an application logging mechanism 120 to detect events received at virtualization infrastructure 110 and initiate response actions indicated by the events.

Application logging mechanism 120 provides for log management by dynamically increasing application logging to a highest (or maximum) level (or rate) just prior to a fault and reducing the logging rate back to a normal operation level after a predetermined time interval, or the fault has been addressed. For example, during a normal operation level. During the normal operation level, logging is set to an error/warnings log level in which there is a low frequency of logging activity. In this level, log messages (or logs) are informative (e.g., abstract/high level logs regarding task being executed. Thus, operation data is provided to indicate operations that are being performed. During a maximum (or debug) level. In the debug level, the operation data includes detailed information regarding operations that are being performed, as well as an intermediate state of the operations. For example, the debug level provides granular details regarding tasks being executed. Developers generally enable this level of logging when attempting to determine a cause of a problem. Thus, the debug level generates a high quantity of logs that occupies a large magnitude of storage space and slows the application.

Figure 2:
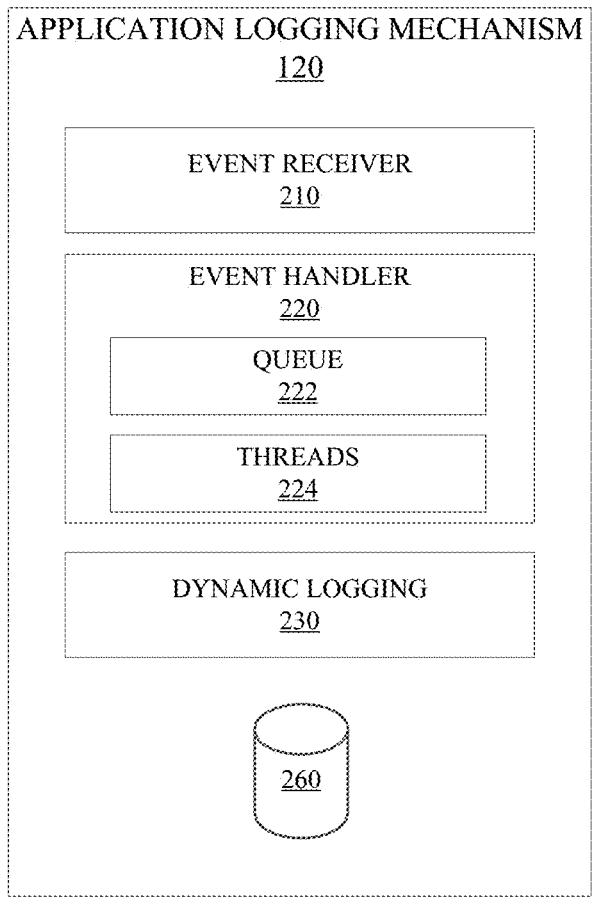
FIG. 2 is a block diagram illustrating one embodiment of an application logging mechanism.

In one embodiment, FIG. 2 is a block diagram illustrating one embodiment of an application logging mechanism 120. As shown in FIG. 2, application logging mechanism 120 includes an event receiver 210, event handler 220 and a dynamic logging manager 230. Event receiver 210 receives the incoming events and pushes the events to event handler 220. Event handler 220 includes an event queue 222 to receive the events from event receiver 210. In one embodiment, event handler 220 includes threads 224, which pull events from queue 222 and generates one or more tasks based on a received event. In such an embodiment, each event may trigger more than one task.

Figure 3:
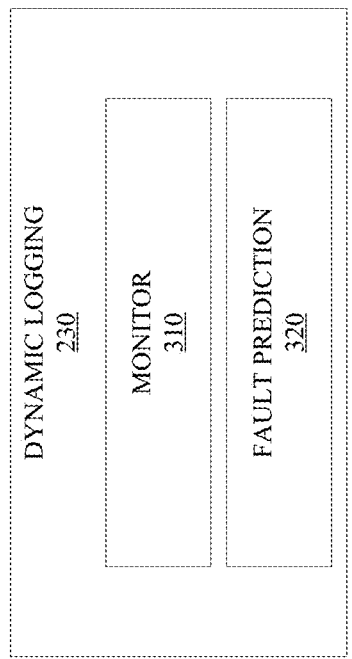
FIG. 3 is a block diagram illustrating one embodiment of a dynamic logging manager.

Dynamic logging manager 230 is implemented to dynamically increase and decrease logging based on a fault prediction. In one embodiment, dynamic logging manager 230 activates a logging rate to the maximum logging level prior to receiving a predicted fault and reduces the logging rate to the normal level after a fault has occurred. FIG. 3 illustrates one embodiment of dynamic logging manager 230.

As shown in FIG. 3, dynamic logging manager 230 includes a monitor 310 to monitor a state of all of the generated tasks. Additionally, monitor 310 records the system state at predetermined intervals. In one embodiment, the system state includes information regarding a size of queue 222 and a number of executing tasks. In this embodiment, monitor 310 saves the state information to database 260 (FIG. 2). In a further embodiment, monitor 310 records the occurrence of task failures that is used to determine a threshold value that represents a queue size at which tasks begin to fail (e.g., predicted queue size). As defined herein, a task failure is a task that fails to complete an objective due to varied reasons and results in a failed state.

In such an embodiment, monitor 310 uses the recorded instances of task failures along with system states recorded at pre-determined intervals. Additionally, a linear regression algorithm is implemented to determine the threshold to accommodate any changes in behavior of the system between failures. For example, a first may occur at a lower queue size, while a second failure may occur at much higher queue size. Thus, recording the system state at regular intervals enable the system to learn (or relearn) a new threshold. In yet a further embodiment, monitor 310 continues to record the failures and dynamically adjust the threshold value to improve the accuracy of the fault prediction engine 320. Thus, monitor 310 is implemented to perform a learning operation by collecting task failure records.

Dynamic logging manager 230 also includes a fault prediction (or prediction) engine 320 that predicts a quantity of tasks that is to be created for a particular queue size. In one embodiment, prediction engine 320 is implemented as a machine learning model that calculates a probability of failure via a linear regression model. For instance, using "x" to represent the number of running tasks and "y" to represent the size of the event queue, the formula for slope of a curve is y=mx+c, where "m" is slope or baseline. Thus, solving the function f(y) provides a queue size at which the tasks may begin to fail.

In one embodiment, the logging rate is increased to the highest level (e.g., Debug Level) for a predetermined time interval upon a determination that the predicted queue size is less than the actual queue size. In a further embodiment, the slope of curve "m" is re-calculated after every prediction with the actual value of 'y' upon an occurrence of a task failure in order to minimize the error in predicted values.

Figure 4:
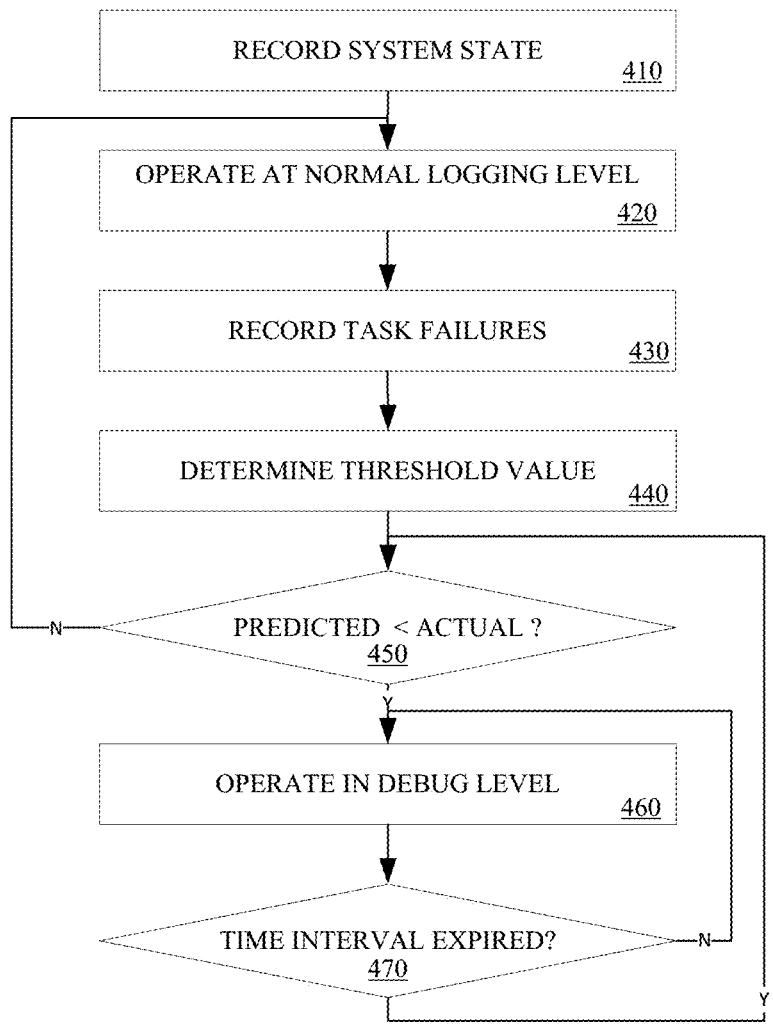
FIG. 4 is a flow diagram illustrating one embodiment of processes implemented by an application logging mechanism.

FIG. 4 is a flow diagram illustrating one embodiment of processes implemented by an application logging mechanism. At processing block 410, the system state is recorded. As discussed above, the state information includes the queue size and the number of executing tasks. Subsequently, the recorded system state is saved. At processing block 420, an application logging operation begins in a normal logging level (e.g., at a normal rate). At processing block 430, task failures are recorded. At processing block 440, the predicted queue size threshold value is determined based on the task failures. As defined herein, the queue threshold value represents a queue size at which tasks may fail. In one embodiment, the queue threshold value is determined by recorded instances of task failures as well as system states recorded at pre-determined interval. As discussed above, linear regression is used to determine the threshold in order to accommodate changes in behavior of system between failures. For example, a first failure may occur at a lower queue size, while a second failure may occur at a much higher queue size.

At decision block 450, a determination is made as to whether a predicted queue size is less than the actual queue size indicated in the state information. A determination that predicted queue size is less than the actual queue size indicates a predicted fault condition has occurred. As a result, the logging level is increased to operate in the Debug Level, processing block 460. Otherwise, control is returned to processing block 420 where operation continues in the normal logging level.

At decision block 470, a determination is made as to whether a time interval has expired since the logging level has been operating in the Debug Level. If not, control is returned to processing block 450 at which operation continues at the Debug Level remains. However upon a determination that the time interval has expired, control is returned to decision block 450, where a determination is made as to whether the predicted queue size continues to be less than the actual queue size indicated in the state information. If not, application logging resumes operation at the normal logging level (e.g., the fault condition has been addressed) at processing block 420. Otherwise, logging continues operating in the Debug Level.

Figure 5:
FIG. 5 illustrates results generated by an application logging mechanism.

FIG. 5 illustrates results generated from an application logging process performed by dynamic logging manager 230. As shown in FIG. 5, a recorded queue size and a number of tasks are recorded over a time interval, where: queuesize=size of event queue; numberoftasks=number of running tasks; predicted_queue_size=queue size at which issue might occur; and predicted_slope=predicted response variable. In one embodiment, twenty values are collected to establish a baseline (or threshold) (e.g., queue size at which tasks might fail). In such an embodiment, the calculation of the response variable begins once the baseline is established. While the queuesize is greater than the predicted_queue_size, log levels are increased. In one embodiment, the accuracy is increased by comparing the error between the predicted and observed queue size values and incorporating the error into the prediction. In a further embodiment, failures and exploratory variables are monitored since the failure threshold varies with time. Accordingly, the threshold is adjusted.

Figure 6:
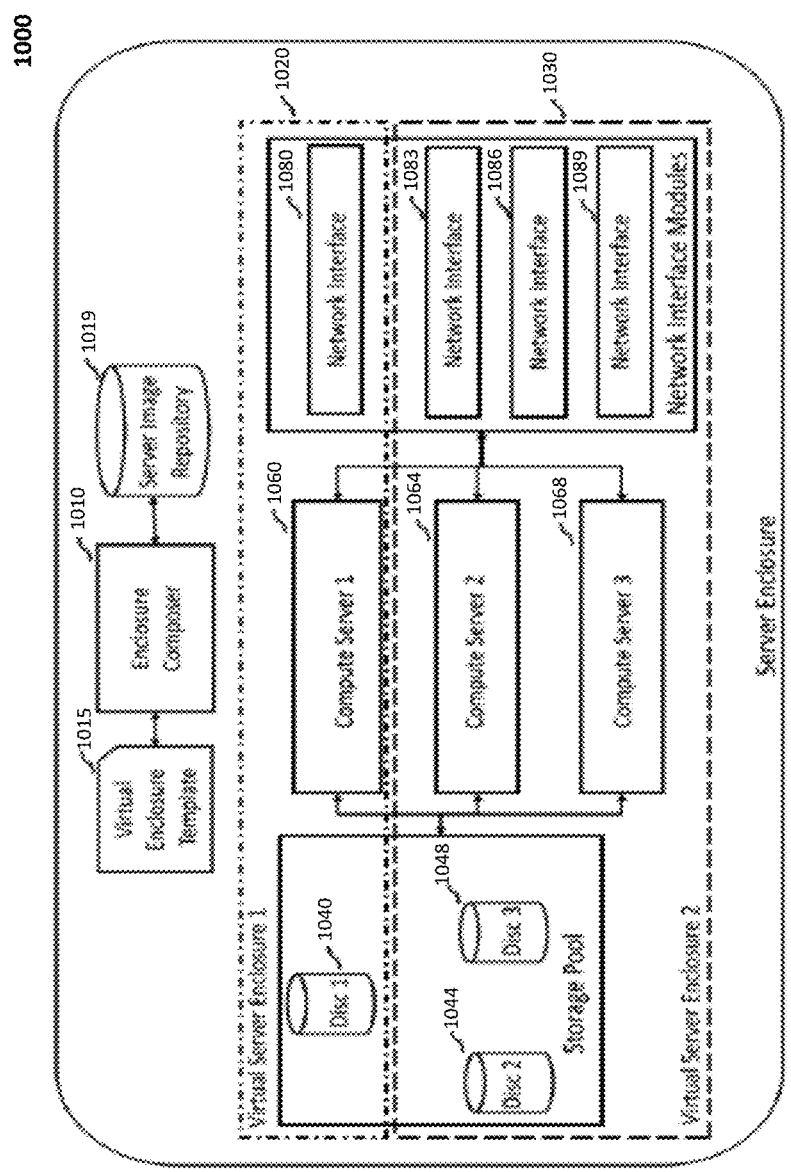
FIG. 6 is a block diagram illustrating one embodiment of a multi-tenant server enclosure.

FIG. 6 is a block diagram illustrating one embodiment of a multi-tenant server enclosure 1000 to implement a virtualization infrastructure 110 having an application logging mechanism 120. The multi-tenant server enclosure 1000 includes a plurality of resources such as a plurality of compute servers (1060, 1064, 1068), storage modules (1040, 1044, 1048) and network interfaces (1080, 1083, 1086, 1089). A plurality of workloads belonging to various tenants may be deployed on the resources of the multi-tenant server enclosure 1000. As generally described herein, compute servers include any number of processing resources (e.g., central processing units, graphics processing units, microcontrollers, application-specific integrated circuits, programmable gate arrays, and/or other processing resources). Similarly, storage modules include any storage resources (e.g., random access memory, non-volatile memory, solid state drives, hard disk drives HDDs, optical storage devices, tape drives, and/or other suitable storage resources). Further, network interfaces include any network resources (e.g., Ethernet, IEEE 802.11 Wi-Fi, and/or other suitable wired or wireless network resources, I/O resources, and/or other suitable computing hardware). Each resource may have metadata associated with it, which may be in the form of labels or annotations specifying different attributes (e.g., application configuration attributes) related to the resource. Each resource capable of being connected to every other resource in the enclosure 1000 and is capable transferring data to every other resource in the enclosure 1000.

The multi-tenant server enclosure 1000 may be segmented into one or more virtual enclosures (1020, 1030) on which the workloads are deployed. Each virtual enclosure is dedicated to a tenant. The multi-tenant server enclosure 1000 further includes an enclosure composer 1010 (also referred to as enclosure controller 1010). The enclosure composer 1010 is responsible for creating, configuring and managing virtual enclosures (1020, 1030) of the multi-tenant server enclosure 1000. The enclosure composer 1010 is connected to a server image repository 1019. The server image repository 1019 comprises a plurality of server images which may be deployed on the virtual enclosures by the enclosure composer 1010. Moreover, multi-tenant server enclosure 1000 includes a virtual enclosure template 1015 which is used for provisioning the virtual enclosures (1020, 1030). The virtual enclosure template 1015 contains parameters for configuration and creation of the virtual enclosure.

Each virtual enclosure is a logical entity comprising one or more compute servers, one or more storage modules and one or more network interfaces. The resources allocated to the virtual enclosure are dedicated to the virtual enclosure and the corresponding tenant. This allows for physical isolation amongst the tenants and therefore provides improved security and manageability. Additionally, each virtual enclosure is created automatically by the enclosure composer 1010 using the virtual enclosure template 1015. It is to be noted that while one virtual enclosure template 1015 is shown in FIG. 6, there can be plurality virtual templates for creating virtual enclosures of varying configurations.

According to one embodiment, enclosure 1000 is a blade server enclosure having a plurality of blade servers. In such an embodiment, each blade server may include a management controller. In a further embodiment, one or more of the management controller at a blade server may managed via enclosure composer 1010 to provide one or more virtual enclosures.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method to facilitate application logging, comprising:
   recording a system state;
   performing application logging at a first logging rate, wherein logging comprises:
     receiving a plurality of events from one or more infrastructure resources via a network interface;
     storing the events in a queue within a memory; and
     generating one or more tasks for each of the plurality of events;
   recording an occurrence of task failures indicating a failure of one or more tasks during the logging;
   determining a predicted queue size threshold value based on the recorded occurrence of task failures;

determining whether that the predicted queue size threshold value is less than an actual queue size; and performing the application logging at a second logging rate upon a determination that the predicted queue size threshold value is less than an actual queue size, wherein the second logging rate is greater than the first logging rate.

2. The method of claim 1, wherein the predicted queue size threshold value represents a predicted queue size at which tasks begin to fail.

3. The method of claim 2, wherein the system state includes information regarding the actual size of the queue and a number of executing tasks.

4. The method of claim 3, further comprising determining whether a time interval has expired since the application logging has been operating at the second logging rate.

5. The method of claim 4, further comprising continuing the application logging at the second logging rate upon a determination that the time interval has not expired.

6. The method of claim 5, further comprising determining whether the predicted queue size threshold value continues to be less than the actual queue size upon a determination that the time interval has expired.

7. The method of claim 1, wherein the predicted queue size threshold value is determined using a machine learning model.

8. The method of claim 7, wherein the machine learning model comprises a linear regression model.

9. A system to facilitate application logging, comprising:
a processor; and
a non-transitory machine-readable medium storing instructions that, when executed, cause the processor to:
record a system state;
perform application logging at a first logging rate, wherein logging comprises:
receiving a plurality of events from one or more infrastructure resources via a network interface;
storing the events in a queue within a memory; and
generating one or more tasks for each of the plurality of events;
record an occurrence of task failures indicating a failure of one or more tasks during the logging;
determine a predicted queue size threshold value based on the recorded occurrence of task failures;
determine whether that the predicted queue size threshold value is less than an actual queue size; and
perform the application logging at a second logging rate upon a determination that the predicted queue size threshold value is less than an actual queue size, wherein the second logging rate is greater than the first logging rate.

10. The system of claim 9, wherein the processor further determines whether a time interval has expired since the application logging has been operating at the second logging rate.

11. The system of claim 10, wherein the processor further continues the application logging at the second logging rate upon a determination that the time interval has not expired.

12. The system of claim 11, wherein the processor determines whether the predicted queue size threshold value continues to be less than the actual queue size upon a determination that the time interval has expired.

13. The system of claim 9, wherein the predicted queue size threshold value is determined using a machine learning model.

14. The system of claim 13, wherein the machine learning model comprises a linear regression model.

15. A non-transitory machine-readable medium storing instructions which, when executed by a processor, cause the processor to:
record a system state;
perform application logging at a first logging rate, wherein logging comprises:
receiving a plurality of events from one or more infrastructure resources via a network interface;
storing the events in a queue within a memory; and
generating one or more tasks for each of the plurality of events;
record an occurrence of task failures indicating a failure of one or more tasks during the logging;
determine a predicted queue size threshold value based on the recorded occurrence of task failures;
determine whether that the predicted queue size threshold value is less than an actual queue size; and
perform the application logging at a second logging rate upon a determination that the predicted queue size threshold value is less than an actual queue size, wherein the second logging rate is greater than the first logging rate.

16. The non-transitory machine-readable medium of claim 15, storing instructions which, when executed by the processor, further cause the processor to determine whether a time interval has expired since the application logging has been operating at the second logging rate.

17. The non-transitory machine-readable medium of claim 16, storing instructions which, when executed by the processor, further cause the processor to continue the application logging at the second logging rate upon a determination that the time interval has not expired.

18. The non-transitory machine-readable medium of claim 17, storing instructions which, when executed by the processor, further cause the processor to determine whether the predicted queue size threshold value continues to be less than the actual queue size upon a determination that the time interval has expired.

19. The non-transitory machine-readable medium of claim 15, wherein the predicted queue size threshold value is determined using a machine learning model.

20. The system of claim 19, wherein the machine learning model comprises a linear regression model.

* * * * *